UNITED STATES PATENT OFFICE.

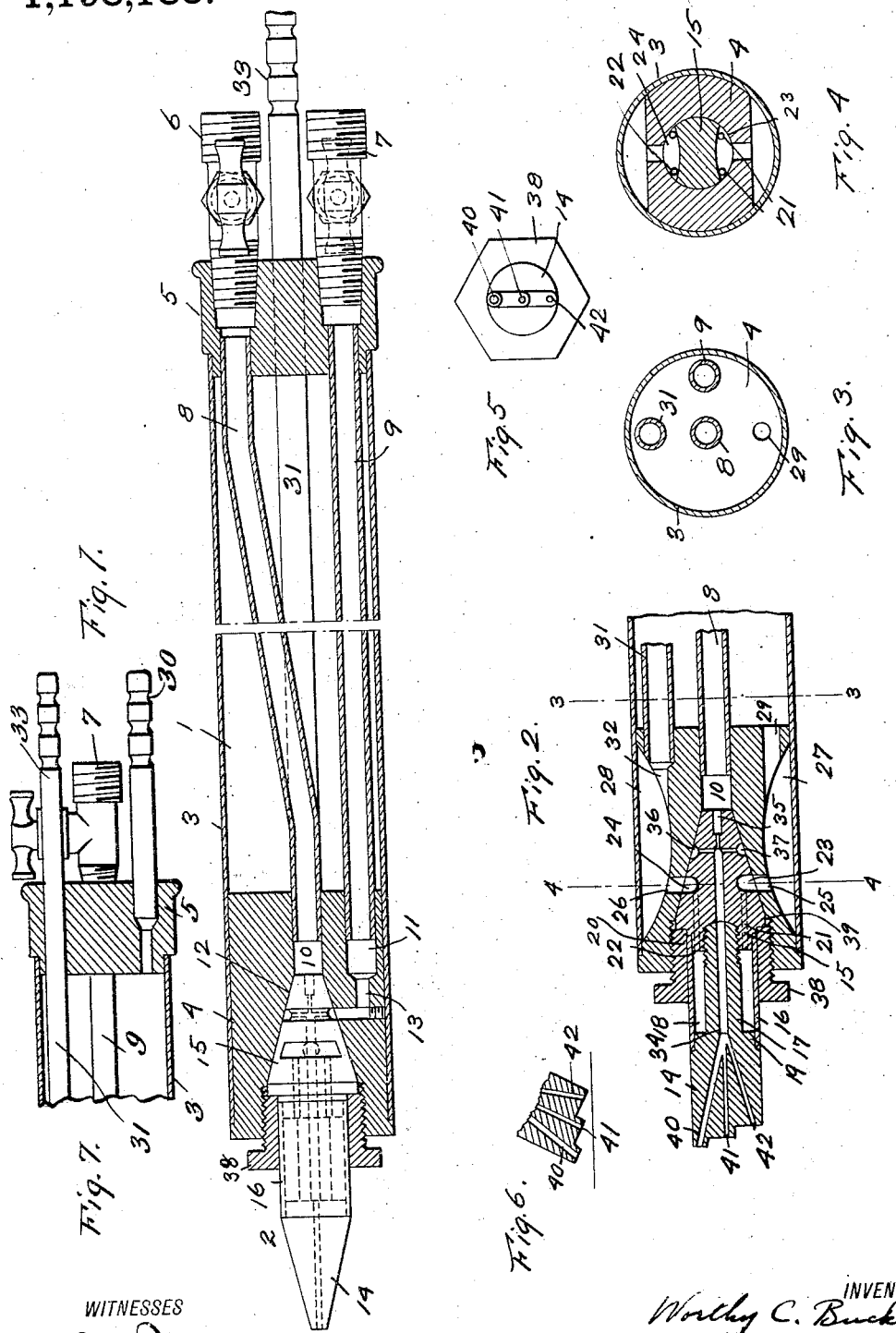

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

TORCH.

1,198,188.  Specification of Letters Patent.  Patented Sept. 12, 1916.

Application filed March 18, 1914. Serial No. 825,546.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Torches, of which the following is a specification.

The invention comprises certain improvements in oxy-acetylene welding torches, the object being to provide a simple and advantageous construction providing for water cooling and enabling the mixture of gases to be delivered in a plurality of jets arranged in alinement, whereby the heating action is confined to the weld and extended for a certain distance along the same.

In the accompanying drawings illustrating the preferred embodiment of the invention: Figure 1 is a longitudinal section through the torch, the tip at the forward end and the connections at the rear end being shown in elevation; Fig. 2 is a longitudinal section through the forward part of the torch, taken in a plane at right angles to that of Fig. 1; Fig. 3 is a cross-section on the line 3—3 of Fig. 2; Fig. 4 is a cross-section on the line 4—4 of Fig. 2; Fig. 5 is a front end view of the tip; Fig. 6 is a fragmentary elevation illustrating the mode of use; and Fig. 7 is a longitudinal section through the rear portion of the torch at right angles to the section of Fig. 1.

The torch comprises a body 1 and a removable and replaceable tip 2. Any one of a plurality of these tips of varying lengths and having passages of varying sizes may be inserted in the body in accordance with the particular requirements of the work in hand.

The body 1 comprises a cylindrical casing 3, having a head 4 and a connection block 5 secured in a water-tight manner in its opposite ends. The connection block is provided with valved connections 6 and 7 for the attachment of flexible tubes leading from suitable sources of supply, and pipes 8 and 9 extend from these connections within the casing and are inserted into bores 10 and 11 in the head. Oxygen is preferably led through the connection 6 and pipe 8, and acetylene through the connection 7 and pipe 9. The oxygen bore 10 in the head opens into the rear end of a conical recess 12, the bore 11 being connected by an angular passage 13 with the side of the same recess.

The tip as illustrated is composed of three pieces, a nozzle portion 14, a seating portion 15 for insertion in the socket 12, and a sleeve 16. The nozzle portion is formed with a rearwardly-projecting reduced extension or stem 17, the rear end of which is screw-threaded for engagement with a corresponding recess in the forward end of the seating portion 15, and the sleeve 16 incloses a space 18 around this stem and is received between shoulders 19 and 20 on the parts 14 and 15 by which it is held tightly in place when the parts are screwed together. In addition the sleeve may be soldered to the parts 14 and 15, but this is unnecessary as a water-tight joint can be effected without soldering. By this construction a water chamber is provided for the purpose of keeping the tip cool, water being supplied to and delivered from the chamber by means of longitudinal passages 21 and 22 respectively, drilled in the seating portion 15. The rear ends of these passages open into separate grooves 23, 24 formed in the sides of the conical rear portion of the part 15, these grooves in turn being adapted to communicate with apertures 25, 26, leading from water chambers 27, 28 in the head into opposite sides of the socket 12. The said chambers 27, 28 are preferably formed by cutting away opposite sides of the head 4 where it is received within the casing 3, which thus constitutes the outer wall of these chambers. The chamber 27 communicates by a supply passage 29 with the open interior of the said casing, which in turn is supplied with water by a suitable connection 30 projecting rearward from the connection block 5. A delivery pipe 31 is secured at its forward end in a bore 32 communicating with the chamber 28 and at its rear end communicates with a second water connection 33. The said connections 30 and 33 are designed to receive flexible tubing, whereby water may be brought from a suitable source and conducted away to an appropriate point of discharge. The cooling water enters by way of the connection 30, fills the casing 3, passes thence by the opening 29 into the chamber 27, thence by ports and passages 25, 23 and 21 into space 18, thence by ports and passages 22, 24 and 26 into chamber 28, and thence through the outlet tube and connection 31, 33.

The portions 14 and 15 of the tip are provided with longitudinal registering bores constituting a mixing passage 34. Separate inlet ports 35 and 36 at the rear end of the tip admit oxygen and acetylene, respectively, to this mixing passage, the torch being of that type in which all of the ports and passages necessary to the mingling and delivery of the gases are combined in the removable and replaceable tip, so that all these factors may be changed in proper proportion by the mere taking out of one tip and putting in another. As shown, there is a single oxygen port 35 opening through the rear end of the tip in line with the mixing passage 34, and a plurality of lateral acetylene ports 36 communicating at their outer ends with an annular groove 37 formed in the conical joint surface of the tip. The mixing passage is thus supplied with oxygen from the conduit 8, 10, and acetylene from the conduit 9, 11, 13, the conical sealing surfaces on the head and tip insuring that there can be no mingling of the gases before their entrance into the latter. The tip is held in place by a bushing 38, which screws into the socketed head and bears against a forwardly facing shoulder 39 on the tip.

Instead of a single jet outlet, the tip is formed with a plurality of jet passages 40, 41, 42, all supplied by the common mixing passage 34 and having their orifices all in alinement, as clearly shown in Fig. 5. These jet passages are formed by drilling converging bores from the forward end of the nozzle portion 14 to the mixing passage 34, this being a simple mode of construction and having the advantage that the jets are delivered in diverging relation. Thus, as shown in Fig. 6, when the torch is disposed for operation with the tip at an inclination, the forward jet passage 40 is arranged at a comparatively low angle to the work, so that its flame plays forwardly along the seam, securing a good preheating effect, while the succeeding flames are directed at successively higher angles to the work so as to insure an intense welding heat. The jet orifice or orifices in advance are preferably larger than the orifice or orifices in the rear, since the leading flame operates upon relatively cold metal and consequently should have greater heating capacity than those which follow to complete the weld. The forward end of the tip is formed at an inclination to the longitudinal axis, so that when the torch is in use, with the tip disposed obliquely in order to direct the heat forwardly along the seam, the several jet orifices may be disposed at substantially the same distance from the work or at not too greatly differing distances, as indicated in Fig. 6. Preferably this oblique end of the tip is formed in a series of steps, each orifice opening through a separate step, but this may be otherwise.

It will be apparent that the form of torch body herein illustrated is not necessarily limited for use with the particular form of tip shown, and, conversely, that the tip illustrated may be mounted in a modified form of body. While in the drawing three jet orifices are illustrated, I wish it to be understood that two or a greater number may be employed.

What I claim as new is:

1. A welding torch comprising a body having conduits for oxygen and a combustible gas, respectively, and a removable and replaceable tip forming a seal between the ends of said conduits and having a mixing passage provided in the rear of the tip with separate inlets for the two kinds of gases and a plurality of jet outlets extending in diverging relation from said mixing passage and delivering in spaced relation at the forward end of the tip.

2. A tip for welding torches comprising a rear seating portion, a forward nozzle portion having a rearwardly-projecting reduced extension screwed into said seating portion, and a sleeve held between said portions and inclosing a chamber around said extension, a longitudinal mixing passage formed in said nozzle and seating portions, separate inlets for oxygen and a combustible gas in said seating portion communicating with the rear end of said mixing passage, a multiplicity of alined jet orifices in said nozzle portion communicating with the forward end of said mixing passage, and passages for a cooling medium leading to and from said chamber.

3. A torch comprising a body formed of a casing having a head and a connection block inserted in its opposite ends, said head having gas passages, pipes for oxygen and a combustible gas respectively leading through the interior of said casing from said connection block to the passages of said head, and a removable tip formed with passages adapted to communicate with the gas passages in the head and having also a water chamber and passages in the tip leading to and from the same, said head having water chambers formed in its sides and covered by said casing and provided with passages to communicate with said passages in the tip.

In witness whereof I have signed my name in the presence of two subscribing witnesses.

WORTHY C. BUCKNAM.

Witnesses:
   J. F. BRANDENBURG,
   E. GREENBERGER.